UNITED STATES PATENT OFFICE.

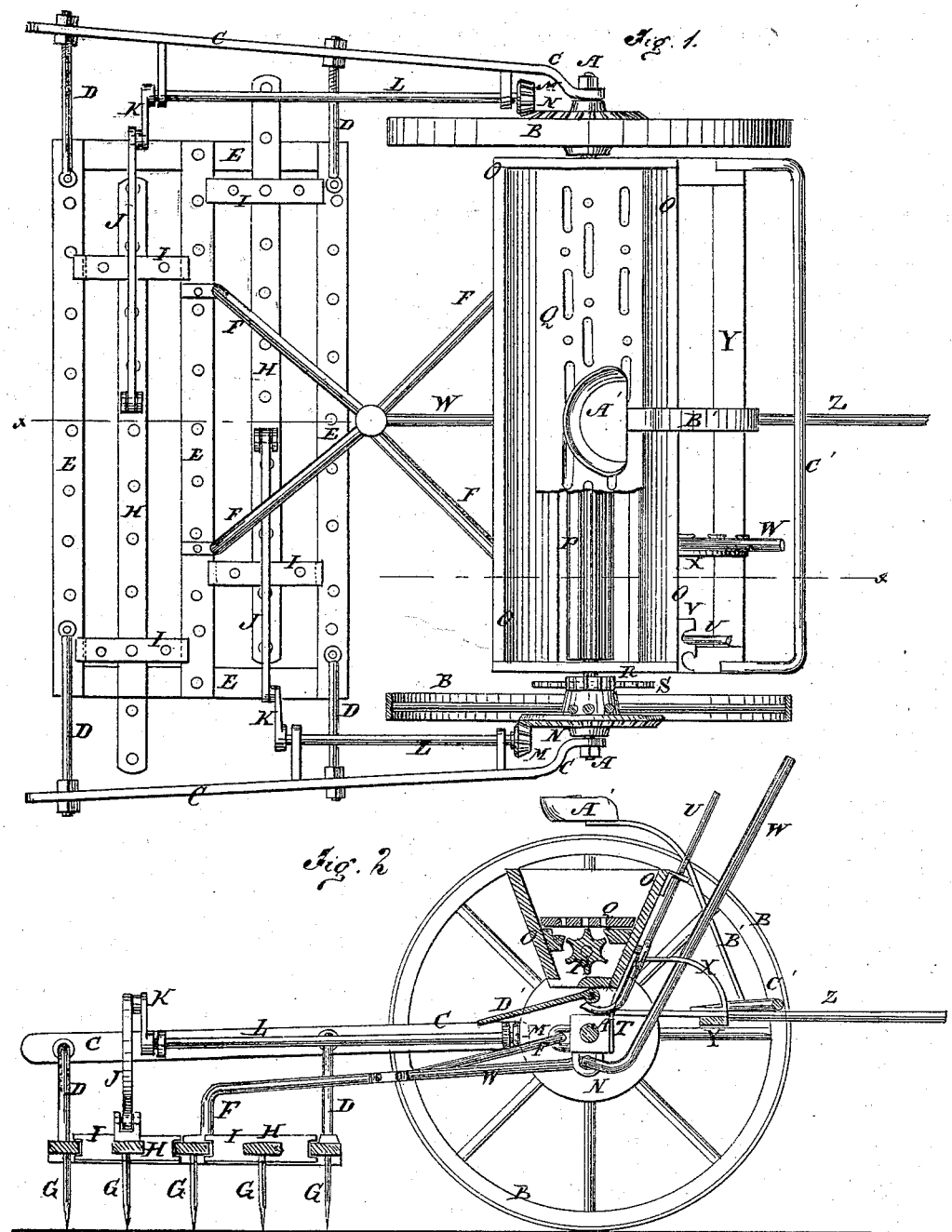

JOHN W. SMITH, OF NASHVILLE, TENNESSEE.

IMPROVEMENT IN COMBINED SEED-SOWERS AND HARROWS.

Specification forming part of Letters Patent No. 147,874, dated February 24, 1874; application filed June 7, 1873.

*To all whom it may concern:*

Be it known that I, JOHN W. SMITH, of Nashville, in the county of Davidson and State of Tennessee, have invented a new and useful Improvement in Combined Harrow and Seed-Sower, of which the following is a specification:

Figure 1 is a top view of my improved machine, parts being broken away to show the construction. Fig. 2 is a detail vertical section of the same, taken through the line $x$ $x$, Fig. 1.

Similar letters of reference indicate corresponding parts.

The invention consists in the improvement of seeders, as hereinafter described, and pointed out in the claims.

A is the axle, upon the journals of which the wheels revolve. To the ends of the axle are pivoted the forward ends of the bars C, which project to the rearward, and are connected, by the arms D, with the stationary part E of the harrow-frame. The frame E is further connected with the axle A by the rods F, the rear ends of which are rigidly attached to the frame E. The middle parts of the rods F cross and are secured to each other, and their forward ends are hinged or pivoted to the rear side of the axle A. By this construction, the draft-strain will be sustained by the axle A in such a way that the frame may be raised from the ground for convenience in turning and passing from place to place. The frame E consists of three longitudinal bars, to which the teeth G are attached, and which are connected at their ends by cross-bars. H are longitudinal bars, similar to, and provided with teeth G in the same way as, the longitudinal bars of the frame E. The bars H are placed parallel with and midway between the longitudinal bars of the frame E, and slide longitudinally in keepers or guides I, attached to the frame E. To each of the sliding bars H is pivoted the inner end of a connecting-rod, J. The rods J project in opposite directions, and their outer ends are pivoted to short cranks K, attached to or formed upon the rear ends of the rods L. The rods L revolve in bearings in arms attached to the bars C; and to their forward ends are attached small bevel-gear wheels M, the teeth of which mesh into larger gear-wheels N, attached to or formed upon the hubs of the wheels B. By this construction, the bars H will be constantly moving back and forth as the machine is drawn forward, so that the ground will be thoroughly stirred. O is the seed-box, the rear part of the bottom of which is cut away or slotted longitudinally for the escape of the seed. In the seed-box O, just above its bottom, is placed a roller, P, which is corrugated longitudinally to take the seed from the box O and discharge it upon the ground. Q is a false bottom, which rests upon cleats attached to the front and rear sides of the seed-box O, and which has numerous holes and slots formed through it to allow the seed to pass to the corrugated roller P. The bottom Q protects the roller P from having to sustain the whole weight of the seed that may be in the box O. The journals of the roller P revolve in bearings in the ends of the box O, and to the projecting end of one of said journals is attached a small gear-wheel, R, the teeth of which mesh into the teeth of a larger gear-wheel, S, attached to the inner end of the hub of the wheel B, so that the roller P may be revolved to drop the seed by the advance of the machine. T are two bars or plates, the lower ends of which are secured to the forward side of the axle A, and their upper ends are secured to the forward side of the box O to support the said box. The upper end of the bar or plate T, next the gear-wheels R S, has a slot formed in it to receive the screw or bolt by which it is secured to the box O, so that the end of the box O may be moved up or down to throw the gear-wheel R out of and into gear with the gear-wheel S. U is a lever, which is pivoted to the forward side of the seed-box O in such a position that, when inclined laterally, its lower end may rest upon the upper side of the axle A, so that, when moved into a vertical position, it may raise the end of the seed-box sufficiently to throw the wheel R out of gear with the gear-wheel S. The lever U is held in any position into which it may be adjusted by a notched bar or plate, V, attached to the seed-box O. W is a lever placed at the forward side of the seed-box, and which is bent to pass along the under side of the axle A, to which it is pivoted, is bent to the rearward, and its rear end is rigidly attached to the bars F at their point of intersection, so that the harrow can be conveniently raised from the ground, and adjusted to work at any desired depth in the ground, by operating the lever W. The lever W is held in any position into which it may be adjusted by a curved notched bar, X, the rear end of which is secured to the axle A, and its forward end to the bar Y, which is attached to the tongue Z, and the ends of which are bent to the rearward, and are attached to the axle A. A' is the driver's seat, which is attached to the upper end of the standard B', the lower end of which is attached to the tongue Z at or near its point of intersection with the bar Y. To the tongue Z, a little in front of the bar Y, is attached the middle part of the rod C', the ends of which are bent to the rearward, and are attached to the bar Y. The rod C' is designed for the driver to rest his feet upon. D' is an apron, which is hinged at its forward edge beneath the forward part of the bottom of the seed-box O, and its rear edge rests upon the bars F, to guide the seed to the rear of the axle A, so that it may fall to the ground without being obstructed.

Having thus described my invention, I claim as new and desire to secure by Letters Patent—

1. In combination with the axle and the harrow-frame E, the end bars C, braces D, and middle frame F, as shown and described, for the purpose specified.

2. The combination, with a seed-sower, of a two-way cultivating-harrow, consisting of toothed frame E and the transversely-reciprocating toothed bars H, for sowing and cross-harrowing the seed into the soil, as described.

JOHN W. SMITH.

Witnesses:
SIMEON R. WALKER,
EDWARD R. RANDALS.